May 25, 1926.
W. DIEHL ET AL
MOLD FOR BRICK AND BUILDING BLOCKS
Filed March 26, 1925
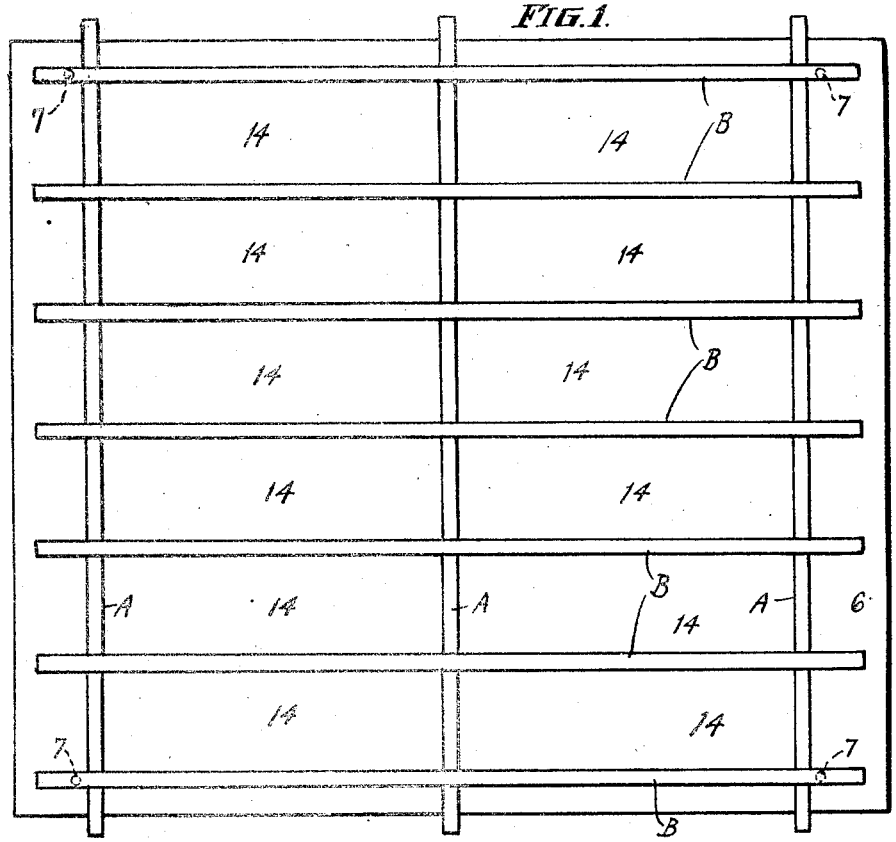
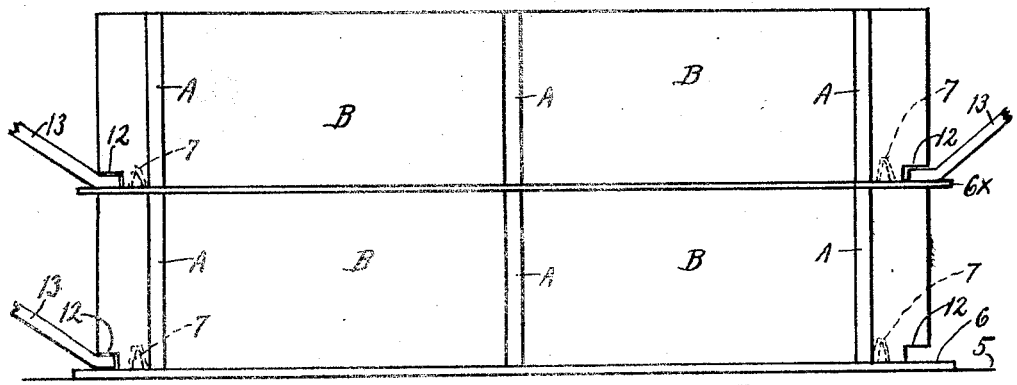
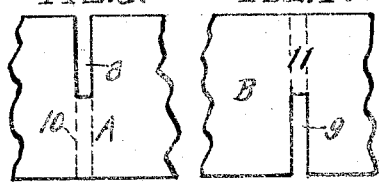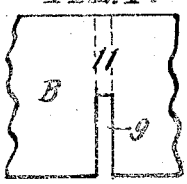
INVENTORS:
Weaver Diehl,
Oscar Eggemo.
By David E. Carlsen
ATTORNEY.

Patented May 25, 1926.

1,586,295

UNITED STATES PATENT OFFICE.

WEAVER DIEHL AND OSCAR EGEMO, OF RAPID CITY, SOUTH DAKOTA.

MOLD FOR BRICK AND BUILDING BLOCKS.

Application filed March 26, 1925. Serial No. 18,419.

Our invention relates to molds or devices for molding bricks and artificial stone blocks of various sizes and description, and the object is to provide an improved mold of said class.

In the accompanying drawings:

Fig. 1 is a top or plan view of our new molding device. Fig. 2 is a side elevation of the device as used in duplicate one mold upon another in molding blocks twice the size of the ordinary blocks. Fig. 3 is a portion of one of the lower vertical partitions in the mold and Fig. 4 is a portion of one of the upper partitions crossing the lower ones.

Referring to the drawing by reference numerals; 5 designates a table or work bench upon which the mold may be used and as soon as filled moved aside to dry its contents and leave room for another mold to be filled.

In most cases it will be preferable to support the mold on a plate to which may have dowel pins 7 projecting upward into some parts of the mold to hold it in place and its parts in rectangular position to each other.

The mold in its single form is composed of a series of flat vertically disposed partitions or bars A having upwardly facing notches 8, and a series of similar flat bars B having inverted notches 9 in which to receive the margins 10 of bars A, while the notches 8 receive the margins like 11 in Fig. 4 of the upper bars B.

The upper bars B have their ends formed with notches producing shoulders 12 under which a suitable lever 13 may engage in starting the bars B upward in removing them after the formed blocks or bricks have been formed and dried in the spaces or cells 14.

In the operation, if but ordinary bricks, tiles or other building blocks of the elongated flat form are to be made the lower half or section of Fig. 2 is employed by filling the concrete or other material into the cells 14 and let it dry. Or to economize on space a plate 6˟ may be placed upon the filled mold and a second mold mounted upon said plate and filled with material, and several plates and mold sections may thus be placed on top of each other.

But when it is desired to make bricks or slabs twice the size of the common size, then we remove the plate 6˟ and place just two mold sections one on top of the other and fill in the material and let it dry, and then remove the bars B and thereafter bars A of the upper section and then likewise the bars of the lower section and we have a dozen or any other desired number of bricks or building blocks of flat structure and approximately as wide as they are long, which is often very desirable in forming structures of blocks, especially where corners of the block or bricks are to project out for ornamental purposes.

What we claim is:

A mold of the class described, composed of two sections of similar size and form, and means for holding said sections one upon the top of the other; each section having a series of cells to be filled from above, and a removable base board, the upper one of which covers the entire top of the lower section and is adapted to be removed when the two sections are used together for molding blocks double the size molded by each individual section.

In testimony whereof we affix our signatures.

WEAVER DIEHL.
OSCAR EGEMO.